April 21, 1936.   C. J. HALEY   2,038,172
WOODEN PIPE JOINT
Filed Sept. 14, 1935
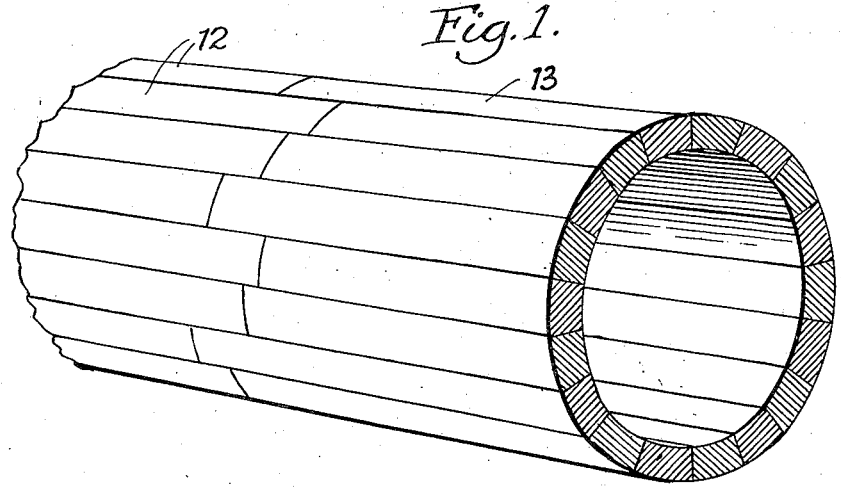
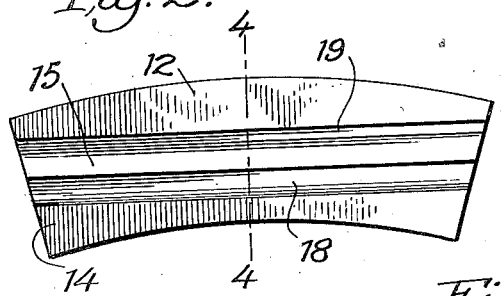
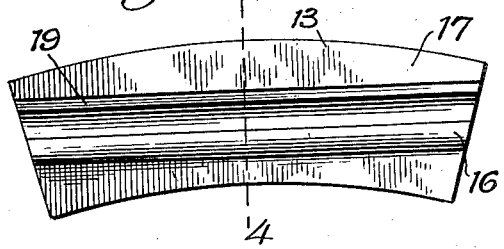
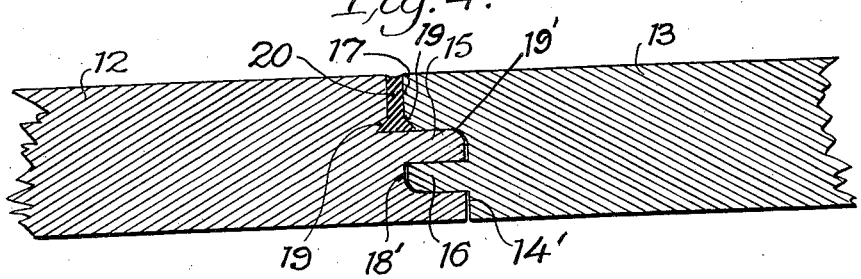
Inventor,
Christopher J. Haley,
By
Attorney

UNITED STATES PATENT OFFICE 2,038,172

WOODEN PIPE JOINT

Christopher J. Haley, Vancouver, British Columbia, Canada

Application September 14, 1935, Serial No. 40,649

8 Claims. (Cl. 138—79)

My invention relates to joints for wooden pipes and the like and it is an object of the same to provide a joint which can be effectively protected from rotting at the very parts of pipes that commonly are the first and most seriously affected. In the use of wooden pipes for carrying water, as in aqueducts, culverts, etc., if they consist of more than a single length of wood, or what is commonly known as a stave of about twenty feet in length, there will usually be cracks where the ends of alined staves abut. This is true even where the pipe is straight, on account of inaccurate cutting, usually done with saws. Where the pipes are longer they must often follow the outlines of a grade, the contour of a hill, the bends of a river, etc., and they often run for hundreds or even thousands of feet. In such cases the joints are left open unequally, some being quite tight and others open to all extents up to perhaps one-eighth of an inch. Such joints cannot be packed effectively on account of their unevenness. Moisture enters and settles in the wood, is perhaps expelled by a change in temperature, enters again, etc., and if the climate is cold the water will freeze in the pockets between the ends of staves, this accelerating the deterioration of the wood adjacent the joints. If the wood can be protected at the joints the entire structure will have its useful life materially increased, whether it be a pipe, flume, silo or other wooden construction exposed to atmospheric conditions.

Another object is to provide an improved tongue and groove structure for use at the ends of staves in a wooden pipe or the like, such as can be cut cheaply and accurately and will be of a form to stand up well and to resist accidental damage.

Another object is to provide packing means for the joints in a wooden pipe, combined with means for protecting the packing means against the internal pressure of the liquid in the pipe.

Referring to the drawing, which is made a part of this application, and in which similar parts are indicated by similar characters of reference:

Fig. 1 is a perspective of a portion of a wooden pipe of the sort with which my invention is to be used, Fig. 2, an end elevation of one member of a joint, Fig. 3, an end elevation of the other member of said joint, and Fig. 4, a longitudinal section of the pipe, taken through a joint according to my invention.

In the drawing, reference character 12 indicates a stave at the left of a joint in Figs. 1 and 4, while 13 indicates a stave at the right of such a joint. The joints, as usual and as shown in Fig. 1, are staggered about the pipe to strengthen the same.

In order to provide an end area which shall be strong and which shall have a large square or cross sectional surface at the end of the staves, so as to resist damage in transportation and in handling in the field, the stave 12 is formed with two tongues 14 and 15 by cutting a groove 18 straight across the end and a parallel groove 19 of somewhat greater depth, the material above the groove 19 being removed as best shown in Fig. 4 the depth of the groove 19 providing an undercut portion for a purpose hereinafter explained. The groove 18 is filleted, as indicated at 18' in Fig. 4, so as to strengthen the tongue 14 and prevent splitting. The end of the tongue, as also the portion above the groove 19, presents a square face.

The stave 13 is provided with a similar groove 19 directly opposite that of the stave 12, but the part 17 above said groove in stave 13 is not removed, as seen in Fig. 4. A tongue 16 of generally similar shape to the tongue 15 of stave 12 is formed on stave 13, the part of the stave below the tongue being removed to leave a square face, as shown at 14' in Fig. 4. The corner between the tongues 16 and 17 is filleted to strengthen this part, as is particularly necessary at the sides of the member 13 where the part 17 is thinnest. See Fig. 3.

When the two alined staves at any part of the pipe are assembled, as in Fig. 4, it will be seen that the bull-nosed ends of the tongues 15 and 16 fit closely into the respective slots that are formed to receive them and in the practical use of my invention they fit more closely than as shown for clearness in the drawing, so that the joint is practically waterproof at the inside, or at least so far as to prevent the pressure of the water or other fluid from being transmitted to the packing shown at 20, it being remembered that the function of this packing is to protect the joint against ingress of moisture from the outside and so to prevent decay of the wood.

The staves are so cut that the opposed faces beyond the tongue 15 are spaced apart to a uniform and substantial extent; e. g., one-eighth inch, so that packing can readily be inserted. For this purpose I may use oakum, wool lead, pine pitch or other material that will protect the most vulnerable part of a wooden pipe; to-wit, the ends of the staves or even the ends of tubular wooden pipes which may be formed according to my invention. Preferably, in order to secure accurately formed and close-fitting parts, the ends of the staves are cut to shape by means of planing machines instead of being sawed, as the usual custom has been.

The caulking seam is of major importance to the success of my invention, making possible a satisfactory packing at the outside of wooden pipe such as has not heretofore been possible, this being due to the fact that the seams of the joints are uniform at all points in straight pipe, and in the cases where the joints are distorted on account of changes of direction at least some substantial crack (about ⅛ in.) will still be found in joints at the inner side of a curve. The other important feature of the seam is its undercut locking conformation, whereby the packing is anchored in place against any danger of removal or loss of function due to any of the contingencies likely to occur in laying the pipe or after it is laid.

It will be obvious to those skilled in the art that many variations may be made in the device shown by way of example in the drawing and described in the specification, all without departing from the spirit of the invention, and that my invention is not limited to use only in wooden pipes, as features thereof can be used in various other fields of industry; therefore I do not limit myself to what is so shown and described but only as required by the state of the known art. Neither is it essential to the purposes of my invention that the slots across the ends of the staves be straight, as they may obviously be of other form without loss of function; e. g., they may be curved concentrically with the staves or the pipe, or curved otherwise than concentrically, etc., the tongues being of course curved correspondingly.

Having thus fully described my invention, what I claim is:

1. In a joint for wooden pipes, a pair of alined staves, each having a bull-nosed tongue extending across an end thereof and a filleted slot adjacent said tongue and positioned to receive and to fit closely the tongue of the other stave, a second tongue on each stave approximately identical in length with the first-named tongue, one of the second-named tongues being at the inside of the pipe and being flat at its end to match a flat face on the other stave, and the other of said second-named tongues having a flat face spaced to a substantial distance from a parallel face on the other stave, both said last-named faces being undercut, and packing filling the slot between said faces and being anchored in the undercut thereof.

2. In a joint for wooden pipes and the like, a pair of pipe members having opposed faces at their outer periphery, connecting means spaced from the outer faces of said members and so formed as to separate said opposed faces at least to a minimum extent, and thus to form a slot between them, packing in said slot, and means in the slot for anchoring the packing in place.

3. In a joint for wooden pipes and the like, a pair of staves, a pair of tongues on each stave interfitting with those of the other, opposed undercut faces outwardly from said tongues, the parts being so formed as to leave a slot between said faces when assembled, and packing in said slot anchored in place by the undercut portions of said faces.

4. A device as in claim 3, the tongues on a stave being of equal length and at least one having a flat end face of substantial width.

5. A device as in claim 3, two of the tongues having matching faces extending widthwise of the respective staves and positioned to lie one on the other when assembled, said tongues being of bull-nose shape and each fitting in a filleted slot in the other stave.

6. In a joint for wooden pipes and the like, a pair of alined curved staves having straight tongues extending across their curved ends and interfitting with each other when assembled, the ends of said tongues being of bull-nose shape and fitting in filleted slots in the respective staves, and a flat-ended tongue on each stave equal in length to the bull-nosed tongue thereon.

7. A device as in claim 6, the flat face on the outer tongue being spaced from a flat face on the other stave to provide a caulking seam, and the other tongues fitting closely to restrain internal pressure.

8. In a joint for wooden pipe and the like, a pair of alined members having opposed end faces at their outer portions, means for spacing said faces apart to at least a predetermined minimum extent under working conditions, said means being spaced from the outer faces of said members, and packing in the space between said separated opposed faces.

CHRISTOPHER J. HALEY.